Aug. 3, 1954   D. B. TOLLEY   2,685,303
LIQUID SUPPLY TANK
Filed July 7, 1952
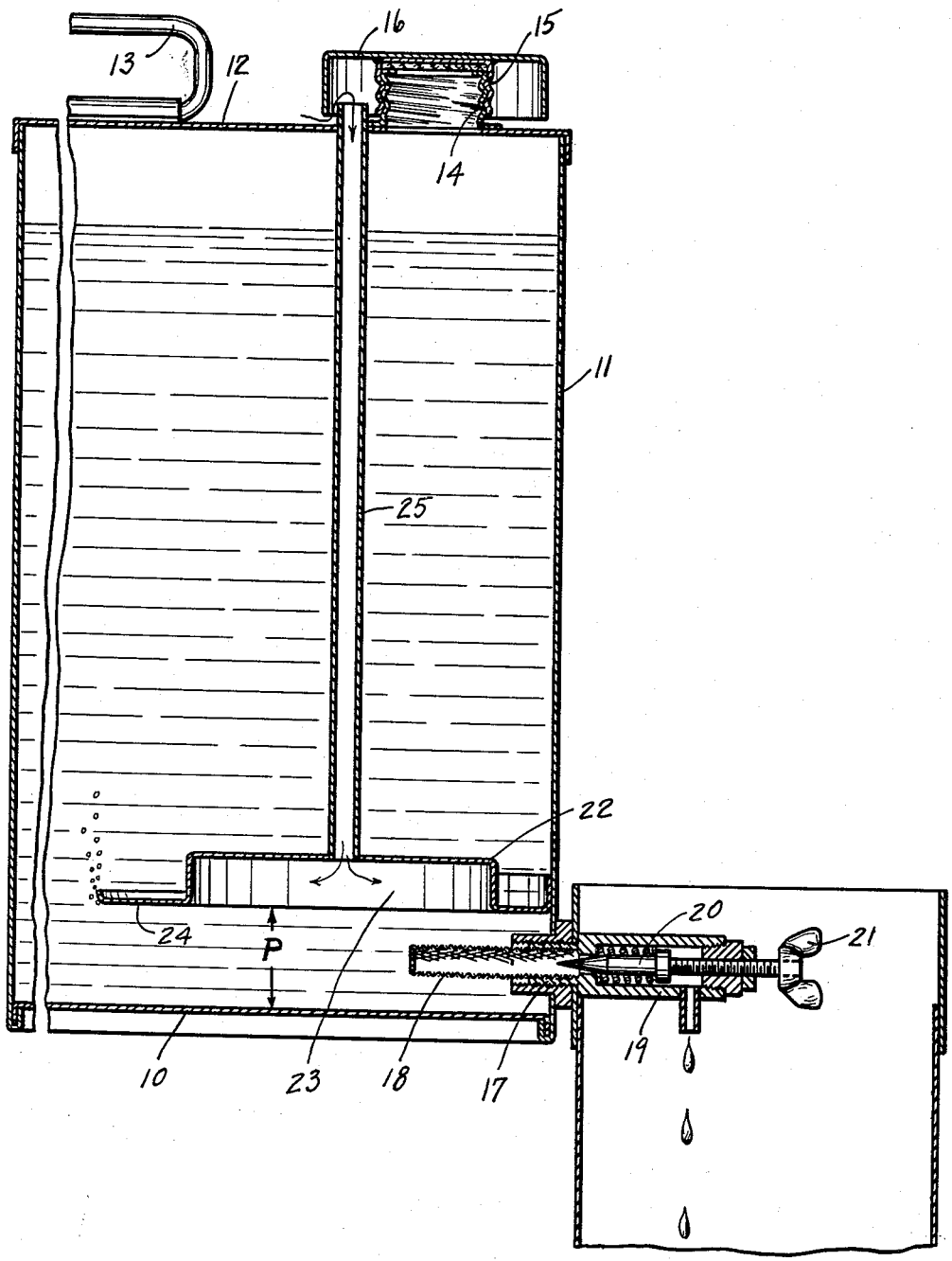
INVENTOR.
DONALD B. TOLLEY.
BY
Lockwood, Galt, Woodard & Smith
ATTORNEYS.

Patented Aug. 3, 1954

2,685,303

UNITED STATES PATENT OFFICE 2,685,303

LIQUID SUPPLY TANK

Donald B. Tolley, Macomb, Ill., assignor to Globe American Corporation, Kokomo, Ind., a corporation Application July 7, 1952, Serial No. 297,484

1 Claim. (Cl. 137—587)

This invention relates to a liquid supply tank, particularly a tank for containing liquid fuel to be metered therefrom by a suitable adjustable control valve at the bottom thereof.

It is the object of the invention to provide a tank of this character arranged to provide a substantially constant liquid pressure at the outlet thereof, whereby the flow of liquid fuel, such as oil, from the tank will be held steady as the liquid level in the tank decreases.

The above is accomplished by providing the tank with a sealed top wall, other than an air tight filler cap closure, whereby there will be a partial vacuum developed at the top of the tank above the liquid level as the liquid is drawn therefrom, and air supplied to replace the liquid drawn therefrom through an air intake passage or tube, in the nature of a stand pipe terminating in an inverted cup-like baffle positioned at a predetermined level above the discharge outlet, the liquid being drawn from under the baffle. By means of this arrangement the liquid pressure at the discharge outlet will be maintained substantially constant according to the liquid column below the baffle, and irrespective of the varying column of liquid extending thereabove.

The full nature of the invention will be understood from the following description and claim and the accompanying drawing:

The figure is a central vertical section through the liquid supply tank and outlet control valve with a portion thereof broken away.

In the drawing there is shown a liquid tank particularly adapted for fuel oil or the like, having a bottom 10, side walls 11 and a sealed top wall 12 supporting a carrying handle 13. In one end of the walls, preferably the top wall, there is provided a threaded filler opening 14 adapted to be sealed by a filler cap 15 upon filling the tank with liquid. The cap may carry a protective cap or cover 16 in the form of an enlarged canopy.

Adjacent the bottom of the tank there is provided an outlet 17 having a screened outlet tube 18 extending radially into a tank a short distance from the side wall 11. Secured thereto there is a discharge spout 19 in which is mounted a spring-pressed metering valve 20 controlled by an adjusting finger operated screw bolt 21, as well known and commonly employed.

Spaced a predetermined distance directly above the filter screen 18 and discharge outlet 17 there is secured to the adjacent portion of the wall 11, a baffle 22 in the form of an inverted cup having a dependent side wall to provide an air chamber 23, the lower edge of the side wall terminating in an outwardly extending flange 24. One side of said flange, as above mentioned, is secured and sealed to a portion of the wall 11 immediately over the discharge outlet. Extending upwardly from the baffle 22 and through the sealed top wall 12 there is an air intake tube 25 in the nature of a stand pipe to provide an air passage to the atmosphere within the protective cap or cover 16.

The tank being filled with liquid through the filler cap and the filler cap sealed, there is no admission of air other than through the air chamber 23 and outwardly from under the flange 24. As liquid is drawn from the tank the upper level thereof will drop, leaving a chamber 26 between the upper level of the liquid and the sealed top wall, which chamber will have induced therein a partial vacuum. The partial vacuum in the chamber 26 will cause air to be drawn through the intake tube 25 into the air chamber 23 which will accordingly be maintained at atmospheric pressure. From the air chamber 23 the air will be drawn from under the flange 24 to escape upwardly into the chamber 26.

The invention claimed is:

A liquid supply tank having a side wall and a top wall, a discharge outlet in said side wall adjacent the bottom thereof, a metering valve in said outlet adjustable to control the flow of liquid from said tank, an inverted cup secured to said side wall extending above and adjacent said outlet, said cup having a surrounding and depending skirt terminating about its lower edge in an outwardly extending flange portion, an air intake tube extending upwardly from the top of said cup through one of said walls having its lower end communicating with said air chamber and its upper end communicating with said atmosphere, said tank having a filler opening in the upper portion thereof, an air tight filler cap removably secured thereover, and a dust protective cap secured to said filler cap having a depending skirt portion extending over and about the upper end of said intake tube.

References Cited in the file of this patent

UNITED STATES PATENTS

| Number | Name | Date |
|---|---|---|
| 710,480 | Loetzer | Oct. 7, 1902 |
| 1,383,411 | Longstreet | July 5, 1921 |
| 1,707,058 | Kauwertz | Mar. 26, 1929 |